United States Patent
Sumilla et al.

(10) Patent No.: US 6,735,937 B2
(45) Date of Patent: May 18, 2004

(54) ENGINE AIR AND FUEL CONTROL

(75) Inventors: Gopichandra Sumilla, Westland, MI (US); Jing Sun, Bloomfield, MI (US); David George Farmer, Plymouth, MI (US); Ilya V. Kolmanovsky, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/971,453

(22) Filed: Oct. 5, 2001

(65) Prior Publication Data

US 2002/0038541 A1 Apr. 4, 2002

Related U.S. Application Data

(63) Continuation of application No. 09/419,755, filed on Oct. 18, 1999, now Pat. No. 6,324,835.

(51) Int. Cl.[7] ................................................. F01N 3/00
(52) U.S. Cl. ........................... 60/274; 60/285; 60/286; 123/90.15; 123/443; 123/692
(58) Field of Search ........................... 60/274, 285, 286, 60/297, 301; 123/90.11, 90.15, 90.16, 90.17, 443, 691, 692

(56) References Cited

U.S. PATENT DOCUMENTS

| | | | | |
|---|---|---|---|---|
| 4,051,816 A | * | 10/1977 | Masaki ........................ | 123/443 |
| 4,056,931 A | * | 11/1977 | Hata ........................... | 123/443 |
| 4,089,310 A | * | 5/1978 | Noguchi et al. ............... | 60/285 |
| 5,377,654 A | * | 1/1995 | LoRusso et al. ............. | 123/692 |
| 5,462,038 A | * | 10/1995 | Kotwicki et al. ........... | 123/692 |
| 5,832,722 A | * | 11/1998 | Cullen et al. .................. | 60/285 |
| 5,954,039 A | * | 9/1999 | Doering et al. ............. | 123/692 |
| 6,014,859 A | * | 1/2000 | Yoshizaki et al. ............. | 60/285 |
| 6,122,910 A | * | 9/2000 | Hoshi et al. ................... | 60/285 |
| 6,151,890 A | * | 11/2000 | Hoshi .......................... | 60/285 |
| 6,205,773 B1 | * | 3/2001 | Suzuki ......................... | 60/285 |
| 6,269,791 B1 | * | 8/2001 | Tanaka et al. ................ | 60/285 |
| 6,557,505 B1 | * | 5/2003 | Hori ............................ | 60/285 |

* cited by examiner

Primary Examiner—Thomas Denion
Assistant Examiner—Tu M. Nguyen
(74) Attorney, Agent, or Firm—Julia Voutyras; Allan J. Lippa

(57) ABSTRACT

A control method for an internal combustion engine has multiple cylinder groups with at least one control device positioned between an intake manifold and a cylinder group. The engine operates the cylinder groups at different air/fuel ratio and uses the control device to balance torque produced by the different cylinder groups. In one aspect of the invention, one cylinder group is operated rich and another cylinder group is operated lean thereby providing heat to an exhaust system located downstream of the engine.

14 Claims, 4 Drawing Sheets

ENGINE AIR AND FUEL CONTROL

This is a Continuation of U.S. Ser. No. 09/419,755, Oct. 18, 1999 now U.S. Pat. No. 6,324,835.

FIELD OF THE INVENTION

The invention relates to a system and method for controlling the air/fuel ratios of cylinders in an internal combustion engine.

BACKGROUND OF THE INVENTION

To improve engine thermal efficiency and increase vehicle fuel economy, a lean burn engine approach has been used. In these system, the engine is operated lean of stoichiometry and relatively unthrottled, thereby decreasing engine pumping work and further increasing fuel efficiency. To increase the range of lean operation, direct injection is used where fuel is injected directly into the engine. In particular, when operating in the stratified mode, which is always lean of stoichiometry, fuel is injected during a compression stroke. Alternatively, when operating in the homogeneous mode, which can be either rich or lean of stoichiometry, fuel is injected during an intake stroke.

Since the engine operates lean for extending periods, and is therefore outside the three way catalyst operating window, a lean NOx trap, or adsorbent, is used. The NOx trap adsorbs NOx when operating lean, and release NOx when operating at or rich of stoichiometry. The NOx trap can also adsorb sulfur, which reduces NOx storage capacity and therefor reduces system efficiency.

One method for removing sulfur requires raising the NOx trap temperature to elevated levels and operating the air/fuel ratio at or rich of stiochiometry. Various methods are known for elevating the NOx trap temperature. One particular method operates some cylinders lean and some cylinders rich. When these two exhaust streams meet at the NOx trap, an exotherm is created thereby heating the NOx trap. In this way, NOx trap temperature is elevated and sulfur can be removed thereby replenishing the NOx storage capacity. Such a system is described in U.S. Pat. No. 5,758,493.

The inventors herein have recognized a disadvantage with the above approach. For example, when some cylinders are operated rich and some are operated lean, there is a torque imbalance since all of the cylinders receive equivalent airflow. This torque imbalance, or fluctuation, causes increased vibration and degrades customer satisfaction. One method to reduce the torque imbalance uses retarded ignition timing in the rich cylinders. The inventors herein have recognized that when using ignition timing to solve the torque imbalance disadvantage, a degradation in fuel economy is experienced since ignition timing retard is used. In other words, fuel economy is reduced since the cylinders operating rich do not produce the full potential torque that could be produced if optimum ignition timing were employed.

SUMMARY OF THE INVENTION

An object of the invention claimed herein is to provide a method for operating some cylinders lean and some cylinders rich while suppressing engine torque fluctuations and maximizing fuel economy.

The above object is achieved and disadvantages of prior approaches overcome by a method for controlling and engine, the engine having a first group of cylinders and a second group of cylinders, each coupled to an intake manifold, the method comprising: providing a base air amount and a base fuel amount in stoichiometric proportion to the first group of cylinders and to the second group of cylinders; adding excess fuel in addition to said base fuel amount to the first group of cylinders thereby providing a rich air/fuel ratio in the first group of cylinders; and adding excess air in addition to said base air amount to the second group of cylinders thereby providing a lean air/fuel ratio in the second group of cylinders.

By adding excess air to the lean cylinder, engine torque is mostly unaffected since the additional air does cause any extra fuel to be burned in the cylinder. Similarly, by adding excess fuel to the rich cylinder, engine torque is mostly unaffected since the additional fuel does not burn in the cylinder. In this way, it is possibly to maintain a balanced engine torque between lean and rich cylinders while providing lean and rich gases to an engine exhaust.

An advantage of the above aspect of the invention is improved fuel economy while operating with differing air/fuel ratios.

Another advantage of the above aspect of the present invention is improved engine smoothness.

In another aspect of the present invention, the method comprises a method for controlling and engine, the engine having a first group of cylinders and a second group of cylinders, the engine coupled to an intake manifold, the engine further having an outlet control device for controlling flow exiting the manifold and entering the first group of cylinders, comprising: providing a base air amount and a base fuel amount in stoichiometric proportion to the first group of cylinders and to the second group of cylinders; adding excess fuel in addition to said base fuel amount to the first group of cylinders thereby providing a rich air/fuel ratio in the first group of cylinders; and adding excess air in addition to said base air amount to the second group of cylinders by adjusting the outlet control device thereby providing a lean air/fuel ratio in the second group of cylinders.

By using the outlet control device, it is possible to have some cylinders operating at a different air/fuel ratio than other cylinders while having each cylinder producing equal torque. In other words, in the example when some cylinders operate lean and some cylinders operate rich, extra air is only added to the lean cylinders and extra fuel is added only to the rich cylinders.

An advantage of the above aspect of the present invention is improved engine smoothness.

Another advantage of the above aspect of the present invention is improved customer satisfaction.

In another aspect of the present invention, the above object is achieved and disadvantages of prior approaches overcome by a method for controlling and engine, the engine having a first group of cylinders and a second group of cylinders, the engine coupled to an intake manifold, the engine further having an outlet control device for controlling flow exiting the manifold and entering the first group of cylinders, the method comprising: requesting a split air/fuel operating mode; in response to said request, operating the first group of cylinders at a first air/fuel ratio; operating the second group of cylinders at a second air/fuel ratio; and adjusting the outlet control device to minimize a torque imbalance between the first group of cylinders and the second group of cylinders.

By adjusting the outlet control device to balance engine torque when operating in a split air/fuel mode, it is possible to provide exhaust gases with differing air/fuel ratios.

An advantage of the above aspect of the present invention is improved engine smoothness.

Another advantage of the above aspect of the present invention is improved customer satisfaction.

Yet another advantage of the above aspect of the present invention is improved emissions.

In still another aspect of the present invention, the above object is achieved and disadvantages of prior approaches overcome by a method for controlling temperature of an emission control device coupled to an engine, the engine having a first group of cylinders and a second group of cylinders, the engine coupled to an intake manifold, the engine further having an outlet control device for controlling flow exiting the manifold and entering the first group of cylinders, the method comprising: determining a first air/fuel ratio based on the temperature; determining a second air/fuel ratio; operating the first group of cylinders at said first air/fuel ratio; operating the second group of cylinders at said second air/fuel ratio; and adjusting the outlet control device to minimize a torque imbalance between the first group of cylinders and the second group of cylinders.

By providing exhaust gases with differing air/fuel ratios to the emission control device, exothermic reactions can control temperature with balanced engine torque.

An advantage of the above aspect of the present invention is improved engine smoothness.

Another advantage of the above aspect of the present invention is improved customer satisfaction.

In still another aspect of the present invention, the above object is achieved and disadvantages of prior approaches overcome by a method for decontaminating an emission control device coupled to an engine, the engine having a first group of cylinders and a second group of cylinders, the engine coupled to an intake manifold, the engine further having an outlet control device for controlling flow exiting the manifold and entering the first group of cylinders, the method comprising: indicating contamination of the emission control device; in response to said indication, operating the first group of cylinders at a first air/fuel ratio based on the temperature; operating the second group of cylinders at a second air/fuel ratio based on the temperature; and adjusting the outlet control device to minimize a torque imbalance between the first group of cylinders and the second group of cylinders.

By providing exhaust gases with differing air/fuel ratios to the emission control device, exothermic reactions can increase temperature and decontaminate the emission control device while also providing balanced engine torque.

An advantage of the above aspect of the present invention is improved engine smoothness.

Another advantage of the above aspect of the present invention is improved emissions.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
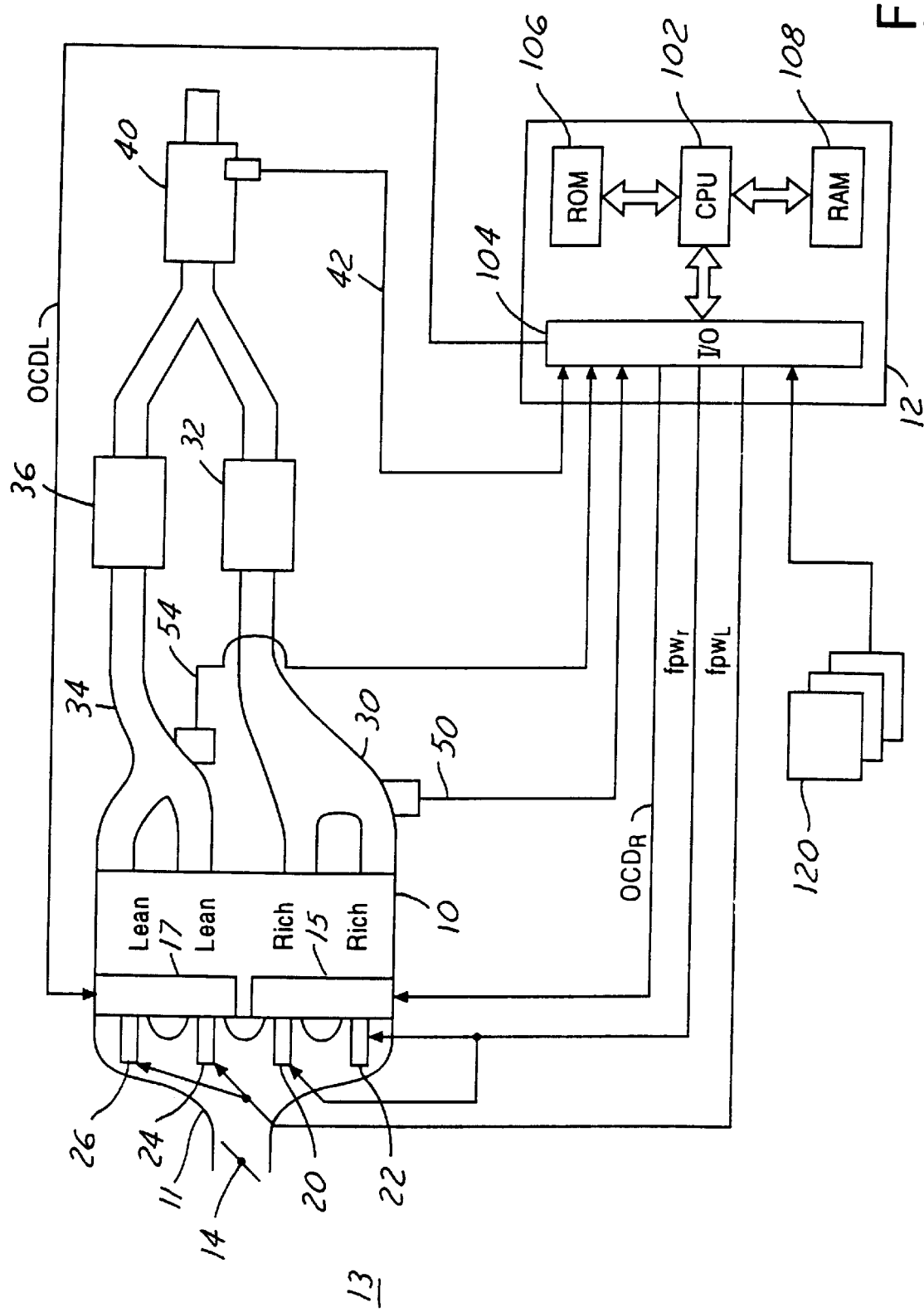
FIGS. 1–2 is a block diagram of an embodiment wherein the invention is used to advantage.

FIG. 1 shows internal combustion engine 10, comprising multiple cylinders couples to intake manifold 11. The engine cylinders are capable of operating within a range of air/fuel ratio ranging from a lean limit to a rich limit. FIG. 1 shows two cylinders operating at a lean air/fuel ratio and two cylinders operating at a rich air/fuel ratio. The intake manifold 11 receives air form surroundings 13 under control of throttle plate 14. The lean cylinders receive air form intake manifold 11 under control of second outlet control device 17. The rich cylinders receive air form intake manifold 11 under control of first control device 15. Outlet control device 15 receives control signal OCDr and outlet control device 17 receives control signal OCDL from controller 12. The rich cylinders receive fuel form injectors 20 and 22. The lean cylinders receive fuel from injectors 24 and 26. The rich cylinders produce exhaust gas that has unburned hydrocarbons and carbon monoxide while the lean cylinders produce exhaust flow that has excess oxygen. The rich exhaust gas exits the rich cylinders through rich manifold 30 and pas through first three way catalyst 32. The lean exhaust gas exits the lean cylinders through lean manifold 34 and pass through second three way catalyst 36. Rich an lean gases then come together to form an exhaust mixture with an exhaust gas mixture air/fuel ratio before entering lean NOx trap 40. The catalytic activity of trap 40 promotes an exothermic chemical reaction from the exhaust mixture formed of both lean and rich gases, resulting in catalyzed combustion, the generation of heat, and the increase of temperature of trap 40.

While the preferred embodiment employs two cylinders operating rich and an equal number of cylinders operating lean, various alternative embodiments are possible. For example, any total number of cylinders may be used with the number of lean and rich cylinders also being variable. For example, an 8 cylinder engine may have 5 cylinders operating lean with 3 cylinders operating rich. In either equally or unequally divided systems, the desired lean and rich air/fuel ratios are determined as will be described later herein with particular reference to FIGS. 3–5.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors 120 coupled to engine 10. In addition, controller 12 receives an indication of trap 40 temperature (T) from temperature sensor 42, first exhaust air/fuel ratio in exhaust manifold 30 via first air/fuel ratio sensor 50, and second exhaust air/fuel ratio in exhaust manifold 34 via second air/fuel ratio sensor 54. Alternatively, temperature (T) may be estimated using various methods known to those skilled in the art. Controller 12 also sends signal fpwr to fuel injectors 20 and 22 and sends signal fpwl to fuel injectors 24 and 26.

Figure 2:
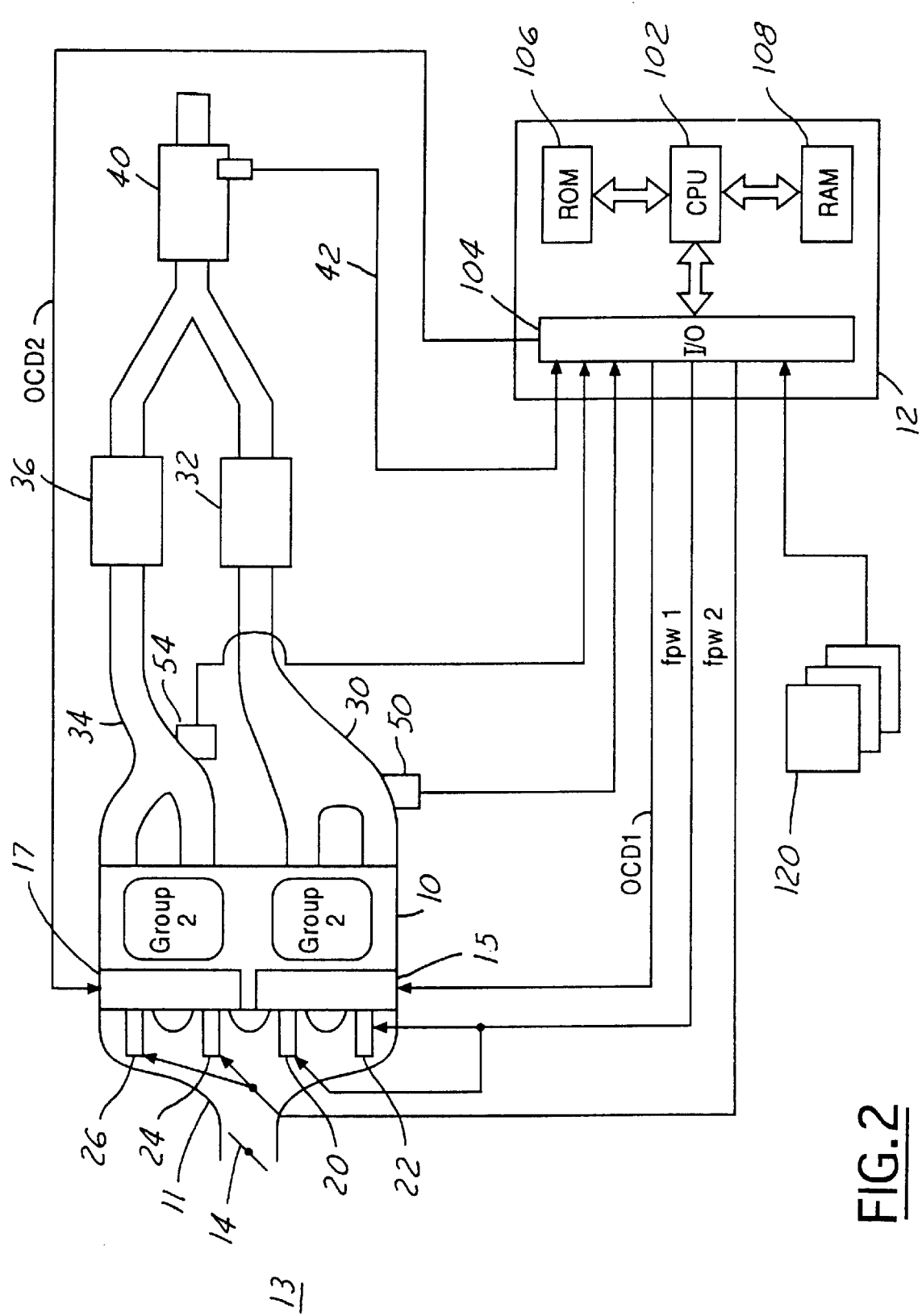

Referring now to FIG. 2, an alternative embodiment is shown where engine 10 operates with a first and second group of cylinders. This alternative embodiment illustrates that any number of cylinders can make up the first and second cylinder groups, and that these groups can be made to operate at any desired air/fuel ratio without engine torque imbalance as described later herein with particular reference to FIGS. 3–5. In other words, both groups may be rich, both lean, one rich and one lean, one rich and one stoichiometric, or any other combination. Cylinder group 1 communicates with intake manifold 11 via outlet control device 15. Cylinder group 2 communicates with intake manifold 11 via outlet control device 17. Cylinder group 1 also communicates with exhaust manifold 30 and cylinder group 2 communicates with exhaust manifold 34. Controller 12 also sends signal fpw1 to fuel injectors 20 and 22 and sends signal fpw2 to fuel injectors 24 and 26. Outlet control device 15 receives control signal OCD1 and outlet control device 17 receives control signal OCD2 from controller 12.

In a preferred embodiment, outlet control devices 15,17 can be devices known to those skilled in the art and termed variable cam timing systems. In these systems, the relative cam timing for opening intake and/or exhaust valves are varied relative to piston motion. Thus, for various cam timing, differing amounts of fresh air and residual burnt gas are trapped in the cylinder. However, various other outlet control devices can be used, such as, for example, variable valve lift, variable valve timing, camless engine technology, swirl control valves, or any other devices known to those skilled.

Also, various inlet control devices can be used in place of throttle 14, such as, for example, an idle air bypass valve, an exhaust gas recirculation valve, or any valve that affects flow entering intake manifold 11. Similarly, various devices can be used as an outlet control device such as, for example, a swirl control valve, a swirl control valve, a charge motion control valve, an intake manifold runner control valve, or an electronically controlled intake valve.

Figure 3:
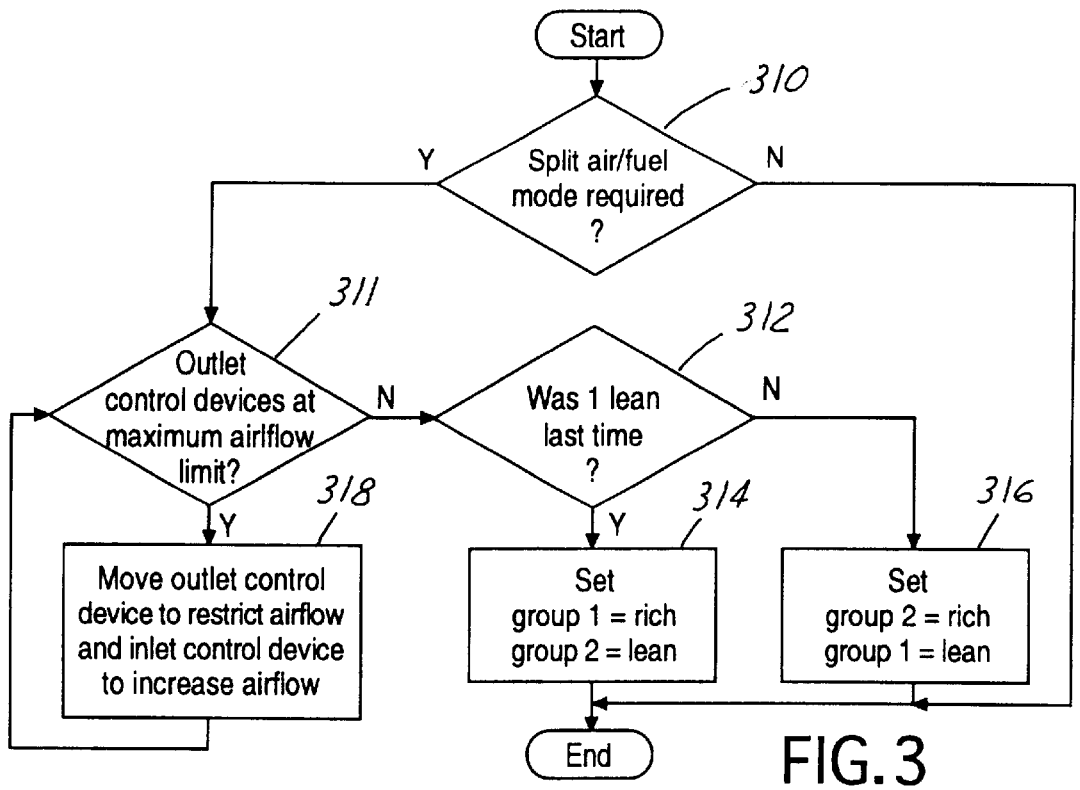
FIGS. 3–5 are high level flow charts of various operations performed by a portion of the embodiment shown in FIGS. 1 and 2.
Figure 5:
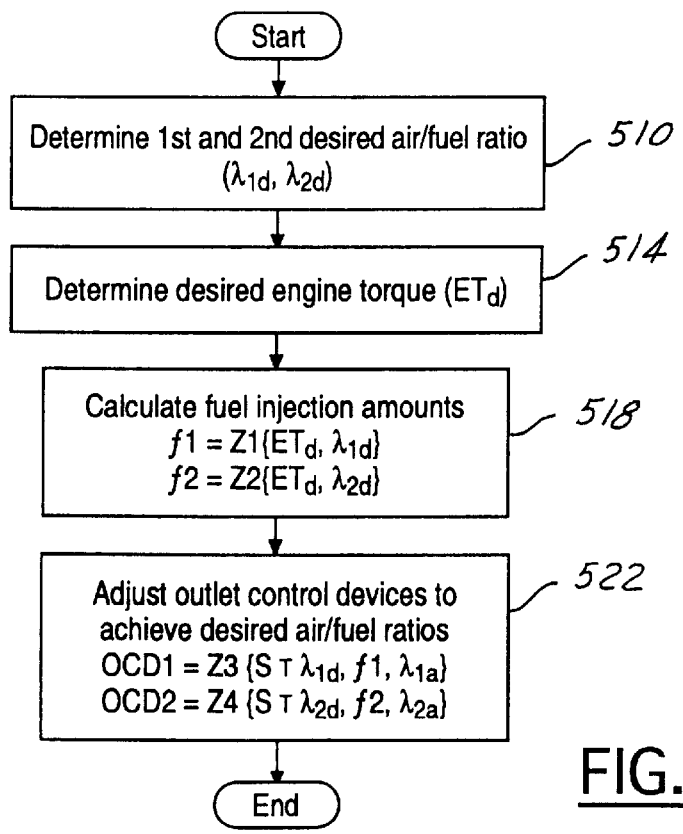
Figure 4:
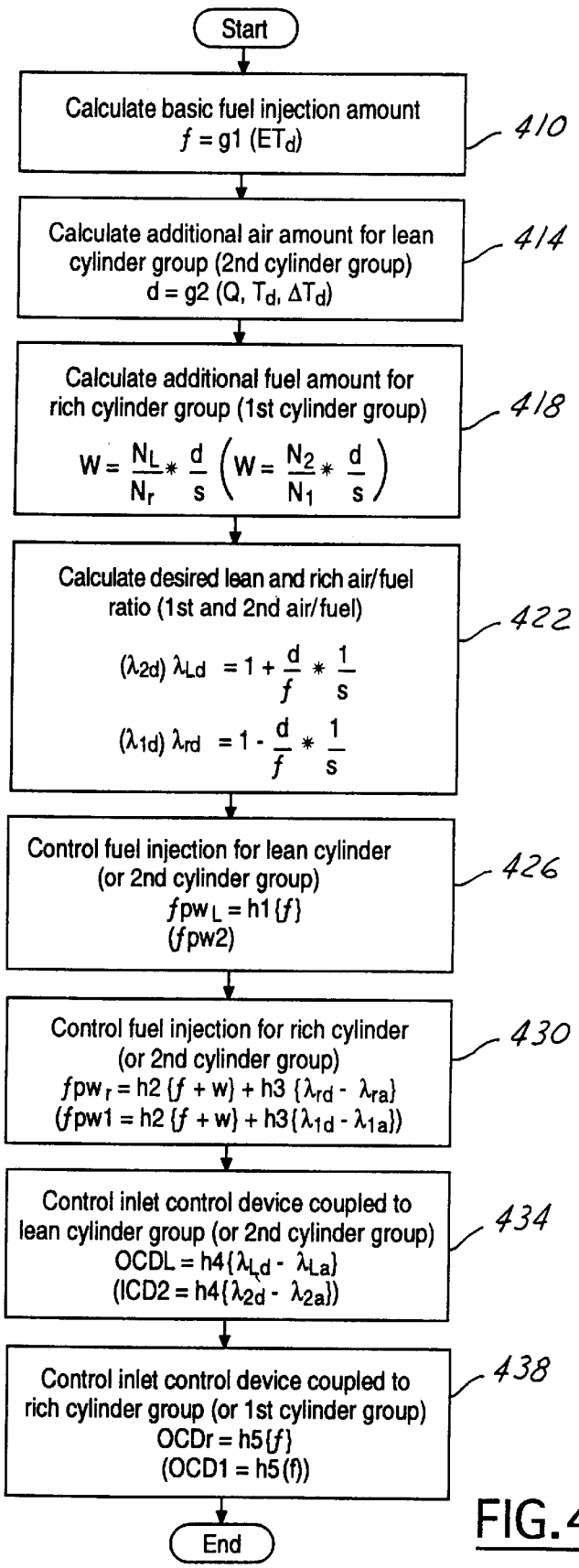

FIGS. 3–5 are high level flow charts of various operations performed for operating first and second cylinder groups at different air/fuel ratios. Referring now to FIG. 3, a routine for determining which cylinder group operates lean and which cylinder group operates rich is described. First, in step 310, a determination is made as to whether a split air/fuel operating mode is required. A split air/fuel operating mode as referred to herein represents operating a first group of cylinders at a first air/fuel ratio and a second group of cylinders at a second air/fuel ratio. Split air/fuel operation may be requested when a determination is made than an accumulated amount of SOx is stored in emission control device 40 reaches a predetermined value. For example, this may be determined based on accumulated mileage, engine operating conditions, or any other method known to those skilled in the art and suggested by this disclosure. When the answer to step 310 is YES, the routine continues to step 311. In step 311, a determination is made as to whether outlet control devices 15,17 are at maximum airflow limits. In other words, a determination is made as to whether outlet control devices 15,17 are within a predetermined range where they are able to cause a predetermined increase in cylinder flow. This is necessary since outlet control devices 15,17 are needed to increase flow when operating in the split air/fuel mode as described herein. In a preferred embodiment, the predetermined range is based on engine speed. When the answer to step 311 is NO, the routine continues to step 312. In step 312, a determination is made as to whether the first group of cylinders was operating lean during the last split air/fuel operating mode. When the answer to step 312 is YES, in step 314 the first cylinder group is set to operate rich and the second cylinder group is set to operate lean. Otherwise, in step 316 the second cylinder group is set to operate rich and the first cylinder group is set to operate lean. Thus, to avoid degradation from operating the same group of cylinders lean during every split air/fuel operating mode, the cylinder groups alternate between the different air/fuel ratios. In other words, during one split air/fuel operating mode, cylinder group 1 operates lean. Then, during the next split air/fuel operating mode, cylinder group 2 operates lean. Various other methods can be used for alternating which cylinder group operates at a lean or rich air/fuel ratio. For example, conditions such as equal lean operating time, or equal integrated excess air, or any other method known to correlate to cylinder degradation related to extensive operating at a given air/fuel ratio.

When the answer to step 311 is YES, the routine continues to step 318. In step 318, outlet control devices 15,17 are moved to restrict airflow and throttle 14 is moved to increase airflow. The net result is that total airflow remains unchanged and outlet control devices 15,17 are moved to a position where there is room to increase flow by moving outlet control devices 15,17. In a preferred embodiment, in step 318, outlet control devices 15,17 and throttle 14 are moved at a predetermined rate so that manifold dynamics are minimized. In other words, if outlet control devices 15,17 and throttle 14 are moved greater than this predetermined rate, transient torque disturbances will be experienced. In a preferred embodiment, this predetermined rate is a function of engine speed and manifold volume.

Referring now to FIG. 4, a routine for controlling fuel injectors 20,22,24,26 and inlet and outlet control devices 15,17 during split air/fuel operating mode is described. First, in step 410, a basic fuel injection amount (f) is calculated based on desired engine torque (ETd) using calibration function (g1). Fuel injection amount (f) is the fuel that burns in both the lean and rich cylinders to produce engine torque. In other words, it is assumed that equal fuel amounts burning in each cylinder produces approximately equal engine torque. However, those skilled in the art will recognize that to account for affects such as increases or decreases in thermal efficiency and pumping work, various correction factors can be applied to find a corrected basic fuel injection amount for the cylinders operating at different air/fuel ratios. This alternative embodiment, where these factors are taken into account, will is now described later herein with particular reference to FIG. 5.

Continuing with FIG. 4, in step 414, an additional air amount (d) for the lean cylinder group is calculated based on various factors. Additional air amount (d) represents additional air that will meet with additional fuel from the rich cylinder group in emission control device 40. As additional air amount (d) is increased, additional air and fuel are made available and thus more heat is generated. Therefore, additional air amount (d) desired is based on a desired amount of heat (Q), a desired temperature for device 40 (Td), a desired temperature increase in device 40 temperature (DTd), actual device 40 temperature (T) or any other parameters used to control temperature or heat in an exhaust system. Next, in step 418, an additional fuel amount (w) form rich cylinders is calculated to make a stoichiometric mixture (with air/fuel ratio equal to S) with additional air amount (d). The following equation shows the calculation of additional fuel amount (w) taking into account the number of cylinder operating lean ($N_L$) and the number of cylinders operating rich $N_r$. Alternatively, additional fuel amount (w) can be calculated using the number of cylinders operating at a first air/fuel ratio ($N_1$) and the number of cylinders operating at a second air/fuel ratio ($N_2$):

$$w = \frac{N_L d}{N_r S}, \text{ or } w = \frac{N_2 d}{N_1 S}$$

In an alternative embodiment where an air/fuel ratio other than stoichiometry (i.e. an arbitrary exhaust air/fuel ratio a$f_e$) in the exhaust is desired, then the following equations can be used:

$$w = \frac{(N_L + N_r)(af_e - S)f - N_L d}{af_e^* N_r} \text{ or}$$

$$w = \frac{(N_2 + N_1)(af_e - S)f - N_2 d}{af_e^* N_1}$$

Next, in step 422, a desired air/fuel ratio is calculated for both the rich and lean cylinder groups (or for the first and second cylinder groups in FIG. 2):

$$\lambda_{1d} = 1 + \frac{d}{f}\frac{1}{S}, \text{ or } \lambda_{2d} = 1 + \frac{d}{f}\frac{1}{S}; \text{ and}$$

$$\lambda_{rd} = 1 - \frac{w}{w+f}, \text{ or } \lambda_{1d} = 1 - \frac{w}{w+f}$$

In an alternate embodiment, correction factors can be applied to the lean desired air/fuel ratio to compensate for increase thermal efficiency. In other word, the lean desired air/fuel ratio may be set slightly less lean so that the increase in thermal efficiency does not cause a torque imbalance.

Next, in step 426, fuel injection signal (fpwL or fpw2) is calculated based on the basic fuel injection amount (f) using calibration function (h1). Similarly, in step 430, fuel injection signal (fpwr or fpw1) is calculated based on the basic fuel injection amount (f) and addition fuel amount (w) using calibration function (h2). Also, to add additional feedback control, calibration function (h3) is used with actual ($l_{ra}$ or $l_{la}$) and desired air/fuel ratios ($l_{rd}$ or $l_{ld}$).

Continuing with FIG. 4, in step 434, outlet control devices 15,17 are controlled according to the following equations:

$$OCDL = h4\{\lambda_{Ld} - \lambda_{La}\},$$

or $$OCD2 = h4\{\lambda_{2d} - \lambda_{2a}\};$$

and $$OCDR = h5\{f\},$$

or $$OCD1 = h5\{f\}$$

Outlet control device 17 thereby controls lean (or second) air/fuel ratio to the desired value. In other words, outlet control device 17 ideally provides a total air amount equal to the basic air amount (b) that is needed for basic fuel injection amount (f) to burn and additional air amount (d) as shown below:

$$b = Sf + d$$

Also, outlet control device 15 is adjusted so that an amount of air that basic fuel injection amount (f) needs to burn is provided. In other words, outlet control device 15 ideally provides basic air amount (b) equal to the product of the stoichiometric air/fuel ratio (S) and basic fuel injection amount (f):

$$b = Sf$$

Referring now to FIG. 5, an alternate embodiment to FIG. 4 is described. First in step 510, desired first and second air/fuel ratios ($\lambda_{1d}$, $\lambda_{2d}$) are determined. These can be determine based on any method in which different air/fuel ratios are determined for different cylinder groups. For example, all cylinder groups may be operated lean of stoichiometry, or all cylinder groups may be operated rich of stoichiometry, some lean and some rich of stoichiometry, or some stoichiometrically and some non-stoichiometrically. Then, in step 514, a desired engine torque is calculated. For example, a desired engine torque is calculated to maintain a desired engine speed, or a desired engine torque is calculated to provide a driver requested wheel or engine torque.

Continuing with FIG. 5, in step 518, a fuel injection amount is calculated for the first and second cylinder groups based on the desired air/fuel ratios so that the desired engine torque (ETd) will be smoothly produced. In other words, correction is made for the different thermal efficiencies and various other factors in which air/fuel ratio affects engine torque. Then, in step 522, outlet control device signals (OCD1,OCD2) are adjusted so that the desired air/fuel ratios are achieved by the actual air/fuel ratios measured by sensors 50,54.

Although several examples of embodiments which practice the invention have been described herein, there are numerous other examples which could also be described. For example, the invention may be used to advantage with both direct injection engines and port fuel injection engines in which outlet control devices may be used. Also, the invention can be applied to any situation where any number of cylinder groups are operated at differing air/fuel ratios and an outlet control device coupled to each cylinder group is used to balance engine torque. For example, even if the differing air/fuel ratios are both rich of stoichiometry or both lean of stoichiometry, according to the present invention, it is possible to balance any engine torque imbalance by control of the corresponding outlet control devices. Further still, in one embodiment, the invention has been shown where one of the outlet control devices is used to increase flow into cylinders operating lean. However, those skilled in the art will recognize the method of present invention can be used where one of the outlet control devices is used to decrease flow into cylinders operating rich. The invention is therefore to be defined only in accordance with the following claims.

We claim:

1. A method for controlling an engine, the engine having a first group of cylinders and a second group of cylinders, the engine coupled to an intake manifold, the engine further having an outlet control device for controlling flow exiting the manifold and entering the first group of cylinders, the method comprising:

requesting a split air/fuel operating mode;

in response to said request;

injecting a mixture of fuel and air in the first group of cylinders with a first air/fuel ratio before the start of a combustion event in the first group of cylinders for burning in such first group of cylinders during such combustion event in the first group of cylinders;

injecting a mixture of the fuel and air in the second group of cylinders with a second air/fuel ratio before the start of a combustion event in the second group of cylinders for burning in such second group of cylinders during such combustion event in such second group of cylinders;

wherein the first group of cylinders has injected therein before such combustion event therein a greater amount of the fuel than the amount of the fuel injected before combustion event in the second group of cylinders; and subsequently adjusting the outlet control device to minimize a torque imbalance between the first group of cylinders and the second group of cylinders; and wherein said first air/fuel ratio is rich of stoichiometry and said second air/fuel ratio is lean of stoichiometry.

2. The method recited in claim 1 wherein said first air/fuel ratio and second air/fuel ratio are alternately switched depending on a previous split air/fuel mode.

3. The method recited in claim 1 wherein said operating steps and said adjusting step is performed when said outlet control device is within a predetermined range.

4. The method recited in claim 1 wherein the engine is further coupled to an emission control device, wherein said request is based on a condition of said emission control device.

5. The method recited in claim 4 wherein said condition is a temperature of said emission control device.

6. The method recited in claim 4 wherein said conditions is an amount of a substance stored in said emission control device.

7. A method for controlling an engine, the engine having a first and a second group of cylinders, the first group of cylinders coupled to a device controlling an amount of air entering only the first group of cylinders, the method comprising:
   injecting a mixture of fuel and air in the first group of cylinders, such mixture being at a rich of stoichiometry air-fuel ratio before a combustion event in the first group of cylinders for burning in such first group of cylinders during such combustion event therein;
   injecting a mixture of the fuel and air in the second group of cylinders at a lean of stoichiometry air-fuel ratio before a combustion event in the second group of cylinders for burning in such second group of cylinders during such combustion event therein;
   wherein the amount of the fuel in the first group of cylinders is greater than the amount of the fuel in the second group of cylinders; and
   subsequently adjusting the device to minimize a torque imbalance between said first and second groups of cylinders.

8. The method as set forth in claim 7 wherein the device is an outlet control device coupled between the first group of cylinders and a manifold of the engine.

9. The method as set forth in claim 8 wherein said outlet control device is a variable cam timing system.

10. A system for controlling an engine, the engine having a first group of cylinders and a second group of cylinders, the system comprising:
   an intake manifold coupled to the engine;
   a device coupled to the first group of cylinders for controlling the flow of air exiting said manifold and entering the first group of cylinders; and
   a controller operating the first group of cylinders to inject into the first group of cylinders before a combustion event in such first group of cylinders a mixture of fuel and air at a rich of stoichiometry air-fuel ratio for burning in such first group of cylinders during such combustion event therein, and to inject into the second group of cylinders before a combustion event in such second group of cylinder mixture of the fuel and air at a lean of stoichiometry air-fuel ratio for burning in such second group of cylinders during such combustion event therein, the amount of the fuel in the first group of cylinders being greater than the amount of the fuel in the second group of cylinders, said controller subsequently adjusting said device to minimize a torque imbalance between the first group of cylinders and the second group of cylinders.

11. The system as set forth in claim 10 wherein said device is a variable cam timing system.

12. A method for controlling temperature of an emission control device coupled to an engine, the engine having a first group of cylinders and a second group of cylinders, the engine coupled to an intake manifold, the engine further having an outlet control device for controlling flow exiting the manifold and entering the first group of cylinders, the method comprising:
   determining a rich of stoichiometry air/fuel ratio based on the temperature;
   determining a lean of stoichiometry air/fuel ratio;
   injecting a mixture of fuel and air in the first group of cylinders before a combustion event in such first group of cylinders for burning in such first group of cylinders during such combustion event therein, such mixture having said rich of stoichiometry air/fuel ratio;
   injecting a mixture of the fuel and air in the second group of cylinders before a combustion event in such second group of cylinders for burning in such second group of cylinders during such combustion event therein, said lean of stoichiometry air/fuel ratio;
   wherein the first group of cylinders has injected therein before such combustion event therein a greater amount of the fuel than the amount of the fuel injected before such combustion event in the second group of cylinders; and
   subsequently adjusting the outlet control device to minimize a torque imbalance between the first group of cylinders and the second group of cylinders.

13. A method for decontaminating an emission control device coupled to an engine, the engine having a first group of cylinders and a second group of cylinders, the engine coupled to an intake manifold, the engine further having an outlet control device for controlling flow exiting the manifold and entering the first group of cylinders, the method comprising:
   indicating contamination of the emission control device;
   in response to said indication,
      injecting into the first group of cylinders before a combustion event therein a mixture of fuel and air at a rich of stoichiometry air/fuel ratio based on temperature for burning in such first group of cylinders during such combustion event therein;
      injecting into the second group of cylinders before a combustion event therein a mixture of fuel and air at a lean of stoichiometry air/fuel ratio based on temperature for burning in such second group of cylinders during such combustion event therein; and
      subsequently adjusting the outlet control device to minimize a torque imbalance between the first group of cylinders and the second group of cylinders.

14. A method for controlling an engine, the engine having a first group of cylinders and a second group of cylinders, the engine coupled to an intake manifold, the engine further having an outlet control device for controlling flow exiting the manifold and entering the first group of cylinders, the method comprising:
   requesting a split air/fuel operating mode;
   in response to said request;
   injecting into the first group of cylinders before a combustion event therein a mixture of fuel and air at a first air/fuel ratio for burning in such first group of cylinders during such combustion event therein;

injecting into the second group of cylinders before such combustion event therein a mixture of fuel and air at a second air/fuel ratio for burning in such second group of cylinders during such combustion event therein; and subsequently adjusting the outlet control device to minimize a torque imbalance between the first group of cylinders and the second group of cylinders;

wherein said first air/fuel ratio is rich of stoichiometry and said second air/fuel ratio is lean of stoichiometry;

wherein the engine is further coupled to an emission control device, wherein said request is based on a condition of said emission control device;

wherein said conditions is an amount of a substance stored in said emission control device; and, wherein said substance is SOx.

* * * * *